United States Patent
Toda et al.

(10) Patent No.: US 7,995,430 B2
(45) Date of Patent: Aug. 9, 2011

(54) OPTICAL DISK DEVICE AND CONTROL METHOD FOR THE SAME

(75) Inventors: Tsuyoshi Toda, Kodaira (JP); Toshiki Ishii, Yokohama (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 603 days.

(21) Appl. No.: 12/080,138

(22) Filed: Mar. 31, 2008

(65) Prior Publication Data

US 2009/0028020 A1 Jan. 29, 2009

(30) Foreign Application Priority Data

Jul. 23, 2007 (JP) ................................. 2007-191325

(51) Int. Cl.
*G11B 7/00* (2006.01)

(52) U.S. Cl. ............... 369/44.34; 369/44.29; 369/44.35; 369/47.53

(58) Field of Classification Search ............... 369/44.29, 369/44.35, 44.36, 44.34, 44.25, 44.26, 53.28, 369/47.53, 59.11, 59.12, 47.19, 59.15, 59.16

See application file for complete search history.

(56) References Cited

U.S. PATENT DOCUMENTS

| | | | | |
|---|---|---|---|---|
| 6,487,146 B1 * | 11/2002 | Verboom | ............... | 369/44.25 |
| 2002/0054554 A1 * | 5/2002 | Yamanaka | ............... | 369/44.23 |
| 2002/0122359 A1 * | 9/2002 | Yoshida | ............... | 369/44.11 |
| 2003/0147332 A1 * | 8/2003 | Ichimura et al. | ............... | 369/112.24 |
| 2005/0063259 A1 * | 3/2005 | Isshiki et al. | ............... | 369/44.34 |
| 2006/0114793 A1 * | 6/2006 | Tonami | ............... | 369/44.23 |
| 2006/0187807 A1 * | 8/2006 | Koppers et al. | ............... | 369/275.1 |
| 2007/0008840 A1 * | 1/2007 | Martens et al. | ............... | 369/44.29 |
| 2007/0183274 A1 * | 8/2007 | Kudo et al. | ............... | 369/44.29 |
| 2008/0008077 A1 * | 1/2008 | Hirai | ............... | 369/112.01 |

FOREIGN PATENT DOCUMENTS

| | | | |
|---|---|---|---|
| JP | 08-115521 A | | 5/1996 |
| JP | 08115521 A | * | 5/1996 |
| JP | 2006-302394 A | | 11/2006 |

* cited by examiner

*Primary Examiner* — Thang V Tran

(74) *Attorney, Agent, or Firm* — Kilpatrick Townsend & Stockton LLP

(57) ABSTRACT

Provided is an optical disk device capable of recording and/or reproducing information on optical disks with high reliability; and a method for controlling the optical disk device. The position of an optical lens where the amplitude of a reproduction signal during the period corresponding to a minimum-length recording mark and a space having the same length reaches its maximum is detected; and the detected position is set as a reference position for the objective lens relative to the optical disk, for use in focus control. Also, the position of the objective lens where the result of multiplication of resolution and modulation becomes greatest is detected; and the detected position is set as a reference position for the objective lens relative to the optical disk, for use in focus control.

14 Claims, 8 Drawing Sheets

OPTICAL DISK DEVICE AND CONTROL METHOD FOR THE SAME

CROSS-REFERENCES TO RELATED APPLICATIONS

This application relates to and claims priority from Japanese Patent Application No. 2007-191325, filed on Jul. 23, 2007, the entire disclosure of which is incorporated herein by reference.

BACKGROUND

1. Field of the Invention

The invention relates generally to an optical disk device and a control method for the optical disk device, and is suitable for use in, for example, an optical disk device compatible with DVDs (Digital Versatile Discs).

2. Description of Related Art

Mark edge recording—a method of recording information on the edges of a recording mark—has been used as one of the methods for recording data on optical disks. This mark edge recording has an advantage over mark position recording—a method of recording information in the center of the recording mark—in high density recording.

However, as discussed in JP08-115521 A, mark edge recording has a drawback in that a recording mark, which is supposed to have a specified length when recorded, may have a different length, depending on the optical power during data recording. When the recording mark has a length different from its proper length, the positions of the edges of the recording mark are shifted, which inhibits correct reading of data recorded on the optical disk.

There are various probable causes of variations in optical power during recording, one of which is defocus during data recording. In practice, defocus reduces the optical power density during data recording and causes a shortage of power, thereby inhibiting formation of a recording mark of the specified length. Defocus also lowers the resolution during data recording as well as data reproduction and may cause data read errors.

JP08-115521 A discloses a solution for the above problems, which involves, in 1-7 modulation mark edge recording, measuring during trial writing the amplitude (A) of a reproduction signal during the period corresponding to a minimum-length recording mark and a space having the same length as the minimum-length recording mark and the amplitude (B) of the reproduction signal during the period corresponding to a maximum-length recording mark and a space having the same length as the maximum-length recording mark; and setting a focus offset that maximizes the resolution value calculated by A/B.

In the method disclosed in JP08-115521 A, it is necessary to measure the value of the resolution while changing the position ("focus position") of the objective lens relative to the optical disk so that the resolution value at each position can be obtained, in order to find a position where the resolution becomes the maximum.

However, when the resolution value is measured at each focus position, because the variations in the amplitude of a reproduction signal are different during the period corresponding to a long recording mark and during the period corresponding to a short recording mark due to the spherical aberration of the objective lens, the focus position exhibiting the maximum resolution is not necessarily the position causing less data read errors.

The invention has been devised taking into consideration the above problems and so it is an object of the invention to provide an optical disk device capable of recording and/or reproducing information on optical disks with high reliability by setting an optimum focus position; and a control method for the optical disk device.

SUMMARY

In order to achieve the above object, the invention provides an optical disk device for focusing a laser beam onto an optical disk using an objective lens and reproducing data recorded on the optical disk as a string of recording marks of different lengths, based on the laser beam reflected from the optical disk. The optical disk device includes: a detection unit for detecting the position of the objective lens where the amplitude of a reproduction signal during the period corresponding to a minimum-length recording mark and a space having the same length reaches its maximum; and a setting unit for setting the detected position as a reference position for the objective lens relative to the optical disk, for use in focus control.

The invention also provides an optical disk device control method, the optical disk device being for focusing a laser beam onto an optical disk using an objective lens and reproducing data recorded on the optical disk as a string of recording marks of different lengths, based on the laser beam reflected from the optical disk. The optical device control method includes: a first step of detecting the position of the objective lens where the amplitude of a reproduction signal during the period corresponding to a minimum-length recording mark and a space having the same length reaches its maximum; and a second step of setting the detected position as a reference position for the objective lens relative to the optical disk, for use in focus control.

The invention also provides an optical disk device for focusing a laser beam onto an optical disk using an objective lens and reproducing data recorded on the optical disk as a string of recording marks of different lengths, based on the laser beam reflected from the optical disk. The optical disk device includes: a detection unit for detecting the position of the objective lens where the result of multiplication of resolution and modulation becomes greatest; and a setting unit for setting the detected position as a reference position for the objective lens relative to the optical disk, for use in focus control.

The invention also provides an optical disk device control method, the optical disk device being for focusing a laser beam onto an optical disk using an objective lens and reproducing data recorded on the optical disk as a string of recording marks of different lengths, based on the laser beam reflected from the optical disk. The optical disk device control method includes: a first step of detecting the position of the objective lens where the result of multiplication of resolution and modulation becomes maximum; and a second step of setting the detected position as a reference position for the objective lens relative to the optical disk, for use in focus control.

According to the invention, an optical disk device capable of recording and/or reproducing information on optical disks with high reliability by setting an optimum focus position that produces a high-quality reproduction signal; and a control method for the optical disk device can be obtained.

Other aspects and advantages of the invention will be apparent from the following description and the appended claims.

DETAILED DESCRIPTION OF PREFERRED EMBODIMENTS

Embodiments of the invention will be described below in detail with reference to the attached drawings.

(1) Embodiment 1

(1-1) Configuration of Optical Disk Device According to Embodiment 1

Figure 1:
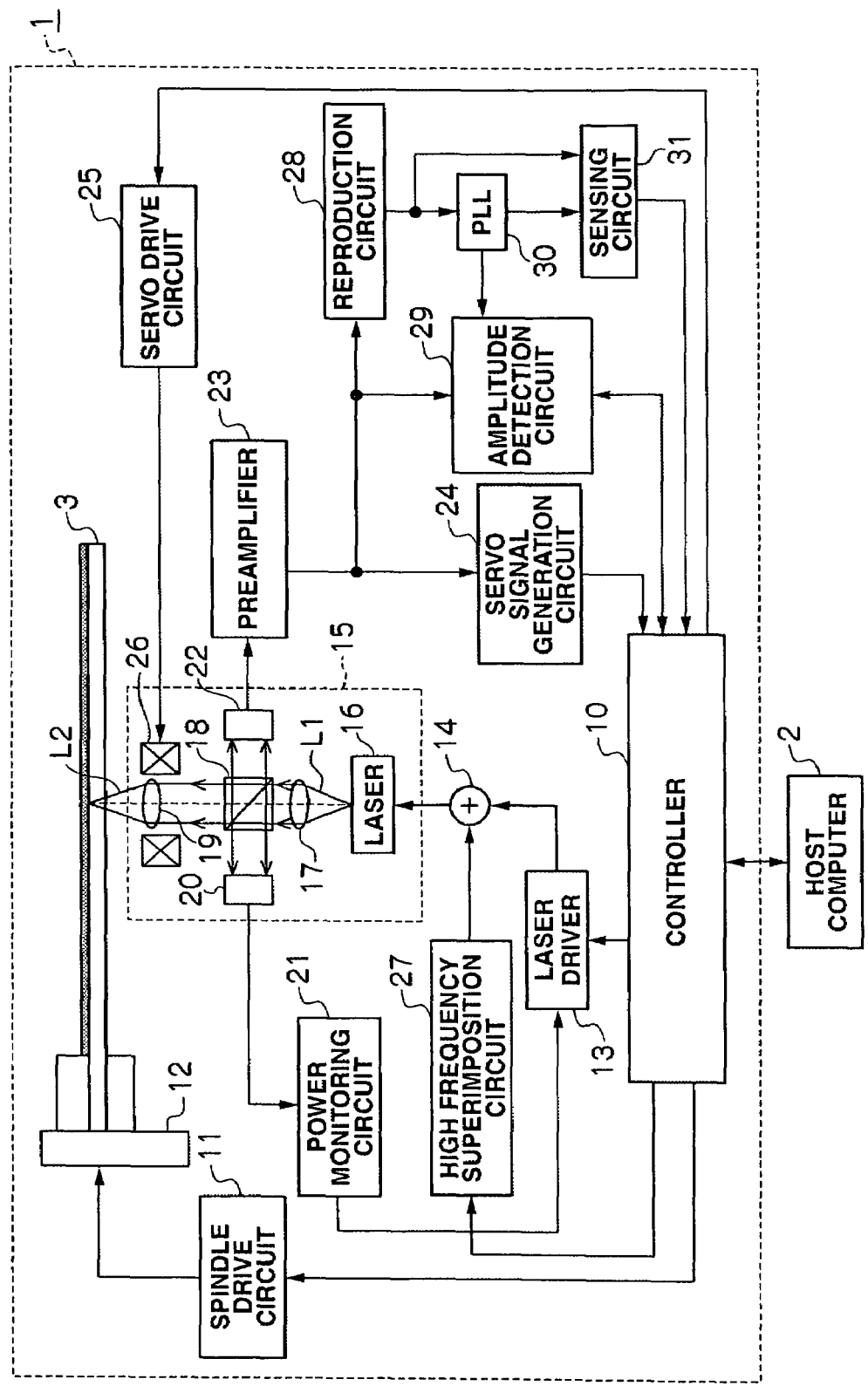
FIG. 1 is a block diagram showing the configuration of an optical disk device according to Embodiment 1.

In FIG. 1, reference numeral 1 indicates an optical disk device according to Embodiment 1. This optical disk device 1 is configured so that it can record/reproduce data on an optical disk 3 such as a DVD in response to a request from a host computer 2.

In the optical disk device 1, various commands from the host computer 2 are sent to a controller 10. The controller 10 is composed of a microcomputer including a CPU (Central Processing Unit) and an internal memory storing various control programs, and executes necessary controls and calculations in response to commands from the host computer 2 or based on various information provided from various circuits inside the optical disk device 1.

The procedure performed when the controller 10 receives a record command from the host computer 2 will be described below. When the controller 10 receives a record command from the host computer 2, it controls a spindle motor 12 via a spindle drive circuit 11, thereby rotating the optical disk 3 loaded in a predetermined state in a corresponding recording mode (e.g., CAV (Constant Angular Velocity) mode, CLV (Constant Linear Velocity) mode, or ZCLV (Zoned Constant Linear Velocity) mode).

The controller 10 then performs, for record target data ("record data") sent together with the record command from the host computer 2, signal processing in preparation for recording such as modulation with 8/16 modulation (2, 10) RLL code, strategy control to form recording marks of specified lengths (3T-11T) on an optical disk based on the record data, and ECC attachment to attach an ECC (Error Correcting Code) to the record data; and transmits the resulting strategy modulation signal to a laser driver 13.

The laser driver 13 amplifies the strategy modulation signal it receives; and applies, as a laser drive signal, the resulting signal level-adjusted strategy modulation signal to a laser diode 16 in an optical pick-up 15 via an addition circuit 14. As a result, the laser diode 16 emits a laser beam L1 which is spatial-modulated according to the above laser drive signal. The laser beam L1 is then converted to parallel lights by a collimator lens 17 and then focused on the recording surface of the optical disk via a polarization beam splitter 18 and an objective lens 19. Thus, the record data is recorded on the optical disk 3 as a string of recording marks of different lengths (3T-11T).

Some parts of the laser beam emitted from the laser diode 16 and incident on the polarization beam splitter 18 are reflected by a polarization film of the polarization beam splitter 18 and then incident on a first photodetector 20 for monitoring. In the first photodetector 20, the laser beam is subject to photoelectric conversion. The first photodetector 20 transmits the resulting monitor signal to a power monitoring circuit 21.

The power monitoring circuit 21 generates a power monitoring signal of a level corresponding to the level of the monitor signal it receives; and transmits it to the laser driver 13. Based on the level of the power monitoring signal received, the laser driver 13 adjusts the gain for the strategy modulation signal so that the power of the laser beam L1 is always at a predetermined specified level.

Meanwhile, the laser beam L1 reflected from the optical disk 3, i.e., reflected light L2 is incident on a second photodetector 22, which is composed of, for example, a quadrant photodetector, via the objective lens 19 and polarization beam splitter 18; and subject to photoelectric conversion in the second photodetector 22. Then, an RF (Radio Frequency) signal obtained as a result of the photoelectric conversion is transmitted via a preamplifier 23 to a servo signal generation circuit 24.

The servo signal generation circuit 24 generates a focus error signal and a tracking error signal based on the RF signal it receives; and transmits them to a servo drive circuit 25 via the controller 10. The servo drive circuit 25 generates a focus actuator drive signal and a tracking actuator drive signal based on the focus error signal and tracking error signal it receives; and transmits them to a biaxial actuator 26 that supports the objective lens 19 in the optical pick-up 15.

The biaxial actuator 26 moves, based on the focus actuator drive signal, the objective lens 19 close to or away from the optical disk 3; and moves, based on the tracking actuator drive signal, the objective lens 19 so that it tilts inwardly or outwardly along a radius of the optical disk 3. Thus, the laser beam L1 coming out of the optical pick-up 15 is just-focused on the recording surface of the optical disk 3 and the focus control and tracking control are executed so that the spot of the laser beam L1 scans a current target track on the optical disk 3.

Meanwhile, the procedure performed when the controller 10 receives a reproduction command from the host computer 2 will be described below. When the controller 10 receives a reproduction command from the host computer 2, it rotates the optical disk 3, which is loaded in the predetermined state, in the rotation mode related to the recording mode of the optical disk, just as in the case of the above-described recording.

The controller 10 then controls the laser driver 13 so that the laser driver 13 sends a laser drive signal of a steady voltage level to the addition circuit 14. Here, the addition circuit 14 also receives, under the control of the controller 10, a high frequency signal from a high frequency superimposition circuit 27, which is for inhibiting laser noise that will be generated by interference between the laser beam L1 from the laser diode 16 and the reflected light L2 from the optical disk 3.

The addition circuit 14 then superimposes the high frequency signal provided from the high frequency superimposition circuit 27 on the laser drive signal provided from the laser driver 13; and applies the resulting laser drive signal to the laser diode 16 in the optical pick-up 15. Based on this laser drive signal, the laser diode 16 emits the laser beam L1 of a predetermined power and this laser beam L1 is focused on the recording surface on the optical disk 3 via the collimator lens 17, polarization beam splitter 18 and objective lens 19.

The laser beam L1 reflected from the optical disk 3, i.e., reflected light L2 is incident on the second photodetector 22 via the objective lens 19 and polarization beam splitter 18. Then, the reflected light L2 is subject to photoelectric conversion in the second photodetector 22 and an RF signal resulting from the photoelectric conversion is sent to the reproduction circuit 28, amplitude detection circuit 29 and servo signal generation circuit 24 via the preamplifier 23.

The reproduction circuit 28 performs waveform equalization and binary conversion to the RF signal it receives; and transmits the resulting binary signal to a PLL (Phase Locked Loop) circuit 30 and sensing circuit 31. Based on the binary signal, the PLL circuit 30 generates a reproduction clock synchronized with the binary signal and transmits it to the sensing circuit 31.

The sensing circuit 31 senses, based on the reproduction clock from the PLL circuit 30, the data based on the binary signal sent from the reproduction circuit 28; and transmits the data to the controller 10 as sensed data. The controller 10 then performs, for the sensed data it receives, processing such as demodulation with $8/16$ modulation (2, 10) RLL codes and correction based on the attached ECC; and transmits the resulting reproduction data to the host computer 2.

When necessary, the amplitude detection circuit 29 detects the amplitude of the RF signal during the period corresponding to a minimum-length (3T in this case) recording mark, which is formed on the recording surface of the optical disk 3, and a space, between minimum-length recording marks, having the same length as the minimum-length recording mark; and transmits the detection result as an amplitude detection signal to the controller 10. The amplitude detection signal is used for optimum focus position ("optimum focus position") learning, which will be described later.

The servo signal generation circuit 24 then generates, just as in recording, a focus error signal and tracking error signal based on the RF signal it receives; and transmits them to the servo drive circuit 25 via the controller 10. Based on these focus error and tracking error signals, the servo drive circuit 25 executes focus control and tracking control.

Note that, again in the reproduction mode, some parts of the laser beam L1 emitted from the laser diode 16 in the optical pick-up 15 are reflected from the polarization film in the polarization beam splitter 18 and incident on the first photodetector 20. Based on the laser beam incident on the first photodetector 20, power control is executed for the laser beam L1 in the reproduction mode, just as in recording.

(1-2) Optimum Focus Position Learning Function According to Embodiment 1

An optimum focus position learning function of the optical disk device 1 will be explained below.

Figure 2:
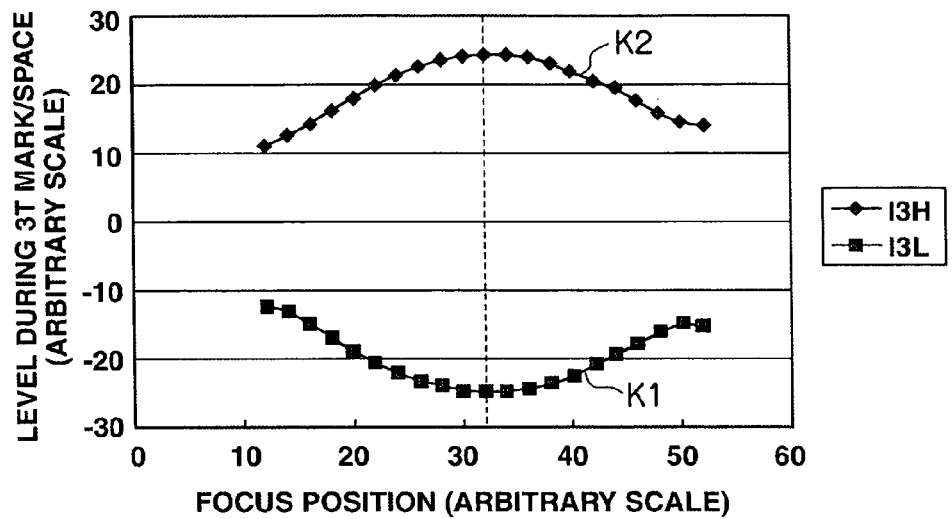
FIG. 2 is a diagram of curves illustrating the level of a reproduction signal during the period corresponding to a minimum-length recording mark and the level of the reproduction signal during the period corresponding to a space, between minimum-length recording marks, having the same length as the minimum-length recording mark.

When reproducing a minimum-length (3T) recording mark and a space, between minimum-length recording marks, having the same length as the minimum-length recording mark, that are repeatedly recorded on the optical disk 3, while changing the focus position of the objective lens 19, the level of the reproduction signal (RF signal) at the focus positions will be as shown in FIG. 2. In FIG. 2, the vertical axis indicates the level of the reproduction signal and the horizontal axis indicates the focus position. Also, in FIG. 2, the lower curve K1 represents the level (I3H) of the RF signal during the period corresponding to a recording mark at various focus positions and the upper curve K2 represents the level (I3L) of the RF signal during the period corresponding to a space between recording marks (hereinafter simply called "space") at the focus positions. In this simulation, the length of each space is set to 3T, the same length as that of the recording mark.

As is clear from FIG. 2, where the recording marks of equal length formed on the optical disk 3 are reproduced while changing the focus position, when the objective lens 19 is at a certain focus position (focal point, i.e., in the example of FIG. 2, the position where the scale of the horizontal axis is approximately 32), the level of the RF signal during the period corresponding to a space reaches its maximum and the level of the RF signal during the period corresponding to a recording mark reaches its minimum. As the objective lens 19 moves away from this focus position, the level of the RF signal during the period corresponding to a space lowers gradually and the level of the RF signal during the period corresponding to a recording mark gradually rises.

Figure 3:
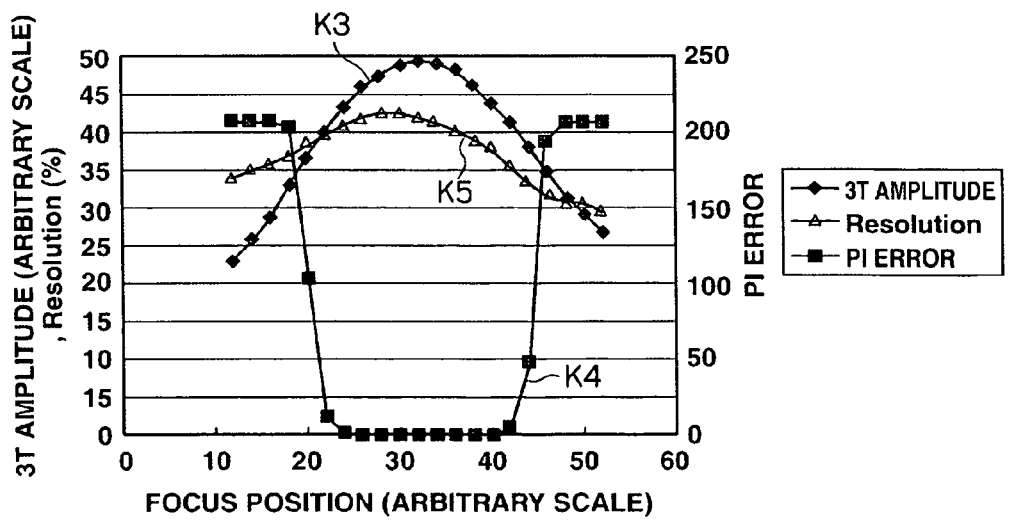
FIG. 3 is a diagram of curves illustrating the relationships between the minimum-length recording mark, resolution and PI error.

When the difference ("recording mark amplitude") between the level of the RF signal during the period corresponding to a space and the level of the RF signal during the period corresponding to a recording mark is obtained for each focus position and the differences are plotted on a graph where the vertical axis indicates the amplitude and the horizontal axis indicates the focus position, the curve K3 shown in FIG. 3 is formed. As can be seen from FIG. 3, the recording mark amplitude reaches its maximum when the focus position is at the above-mentioned "certain focus position" and gradually becomes small when the focus position moves away from the "certain focus position."

Meanwhile, the curve K4 FIG. 3 is formed by plotting in the chart the number of parity errors ("number of PI errors") of a binary signal generated at each focus position. The number of PI errors is the value representing the number of errors in each ECC block before the controller 10 performs error correction using ECCs in the reproduction mode, and the value ranges from 0 to 208. The smaller the number of PI errors is, the higher the quality of the reproduction signal is and, the larger the number of PI errors is, the lower the quality of the reproduction signal is. In the example of FIG. 3, the number of PI errors is small and a good reproduction signal is obtained at the focus position where the value of the recording mark amplitude is large.

Figure 4:
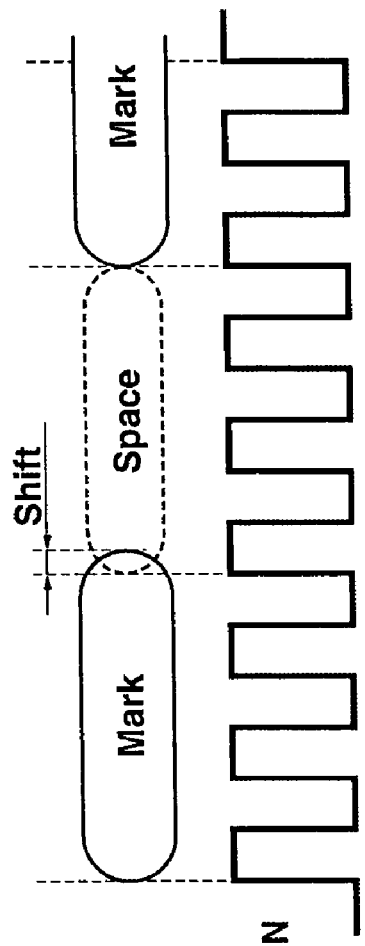
FIG. 4(A) is a conceptual diagram illustrating the relationships between the number of PI errors and the lengths of recording marks.
FIG. 4(B) is a waveform diagram illustrating the relationships between the number of PI errors and the lengths of recording marks.

The above relationships between the recording mark amplitude and the number of PI errors is remarkable for short recording marks. This is because, as shown in FIGS. 4(A) and 4(B) where the amount of shift of the length of a recording mark from the specified length is "Shift," the number of PI errors is proportional to the jitter size as shown in the formula 1:

$$\text{NUMBER OF PI ERRORS} \propto \text{JITTER} \propto 1/\text{SNR} + \text{Shift} \quad (1)$$

and the size of the jitter is proportional to the result of adding the shift amount ("shift") to the inverse number ("SNR") of the SN ratio of the recording mark. In other words, the recording mark amplitude of the reproduction signal during the period corresponding to a minimum-length recording mark ("minimum-length recording mark"), that has the worst SN ratio of other recording marks, and a space having the same length as the minimum-length recording mark, is most unlikely to be affected by the "shift" and so the number of PI errors and the SN ratio are proportional to each other.

In the optical disk device 1 according to Embodiment 1, in trial writing performed when an optical disk 3 is loaded, a minimum-length recording mark and a space having the same length as the minimum-length recording mark are repeatedly recorded on a trial write area on the inner or outer radius of the optical disk 3; and the focus position where the recording mark amplitude exhibited when reproducing the minimum-length recording mark and a space having the same length reaches its maximum is learned as an optimum focus position. Instead of using the minimum-length recording marks written in the trial writing, minimum-length recording marks that have been recorded in advance in the trial write area may be used.

Figure 5:
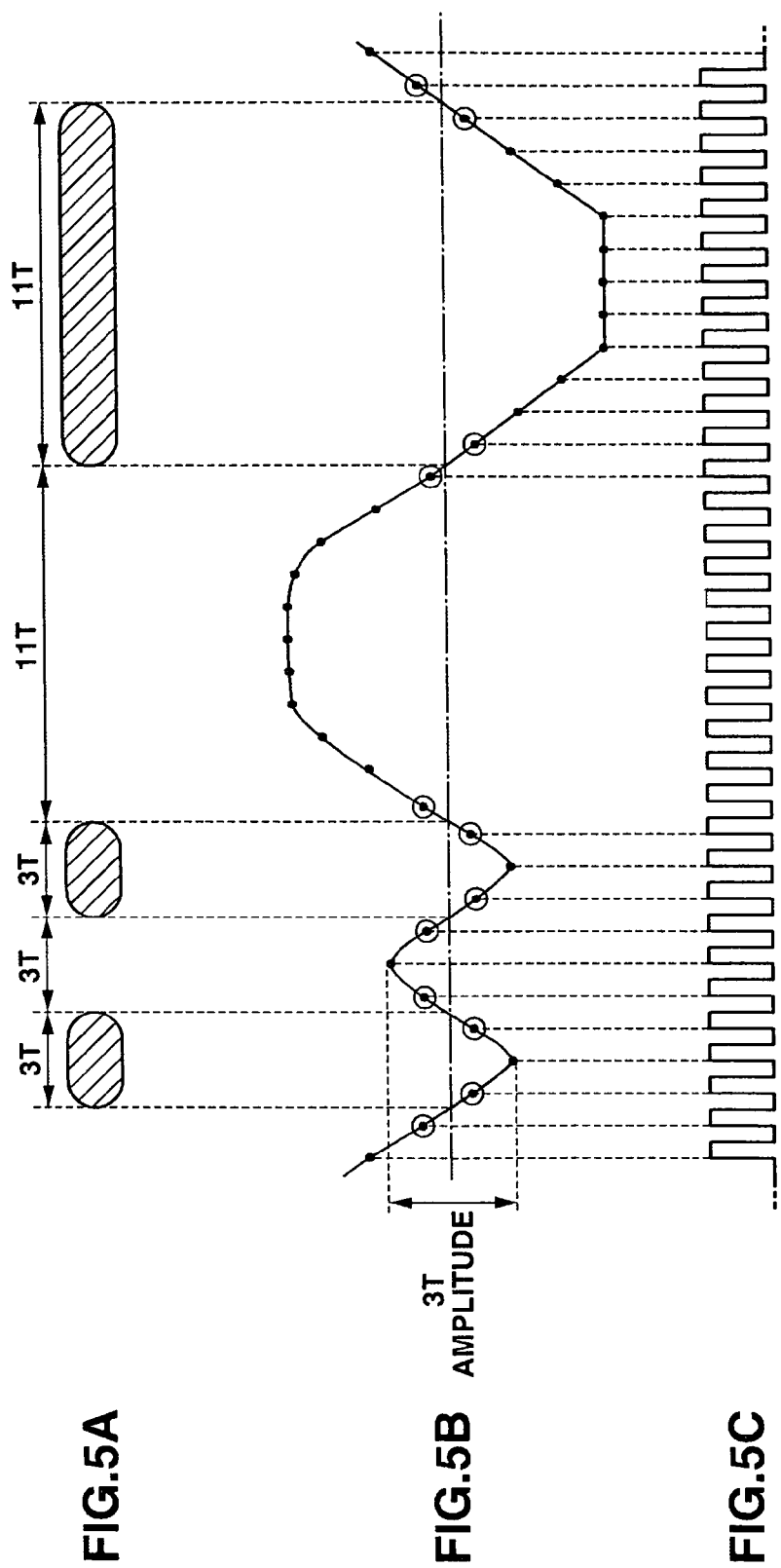
FIG. 5(A) is a conceptual diagram illustrating an amplitude detection method performed utilized in an amplitude detection circuit.
FIG. 5(B) is a waveform diagram illustrating the amplitude detection method executed by the amplitude detection circuit.
FIG. 5(C) is a waveform diagram illustrating the amplitude detection method executed by the amplitude detection circuit.

A method in which the amplitude detection circuit 29 detects the recording mark amplitude of the reproduction signal during the period corresponding to a minimum-length recording mark and a space having the same length will be explained below. In Embodiment 1, in accordance with a reproduction clock such as the one shown in FIG. 5(C) provided from the PLL circuit 30, the amplitude detection circuit 29 samples an RF signal such as the one shown in FIG. 5(B) provided from the preamplifier 23, at the rising edges of the reproduction clock.

Here, it is judged that the front edge of a recording mark exists between, from among sampling timings shown with "•" in FIG. 5(B), two successive sampling timings where the sampling value in the preceding sampling timing is higher than the level of a direct current component of the RF signal ("mark/space boundary level") and the sampling value in the following sampling timing is lower than the mark/space boundary level (see FIGS. 5(A) and 5(B)).

It is also judged that the rear edge or the recording mark exists between two successive sampling timings where the sampling value in the preceding sampling timing is lower than the mark/space boundary level and the sampling value in the following sampling timing is higher than the mark/space boundary level (see FIGS. 5(A) and 5(B)).

Based on this principle, when the amplitude detection circuit 29 detects a recording mark where the distance between its front edge and rear edge corresponds to three clocks, it stores the smallest sampling value in the recording mark. Again based on the above principle, when the amplitude detection circuit 29 detects a space of length corresponding to three clocks, it stores the maximum sampling value in that space. The amplitude detection circuit 29 then calculates the difference between the sampling values detected in the space and the recording mark; and transmits it as an amplitude detection signal to the controller 10.

In trial writing, the controller 10 reproduces data recorded in the trial write area while changing the focus position; learns, based on the amplitude detection signal sent from the amplitude detection circuit 29, the focus position where the recording mark amplitude of the reproduction signal during the period corresponding to a minimum-length recording mark and a space having the same length reaches its maximum as the optimum focus position; and sets the optimum focus position as a reference position for the objective lens 19 relative to the optical disk 3 for use in the focus control.

As described above, because it is possible to detect the lengths of recording marks and spaces as well as the levels of the RF signal during the periods corresponding to the marks and spaces, optimum focus position learning can be achieved not only by reproducing test marks but also by reproducing random data or actually-recorded information data.

Figure 6:
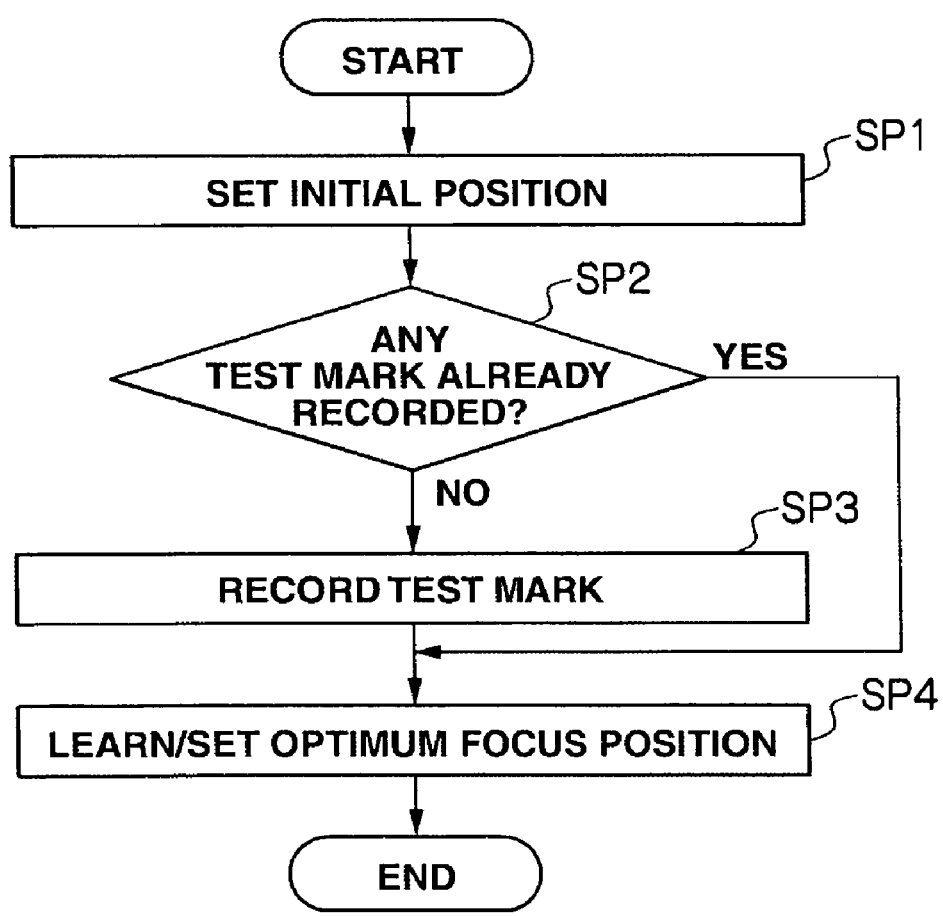
FIG. 6 is a flowchart of the procedure of optimum focus position learning.

FIG. 6 is a flowchart of the procedure the controller 10 performs for the above optimum focus position learning. The optical disk device 1 performs the optimum focus position learning before writing predetermined test data in a trial write area and making various adjustments and settings such as gain adjustment for focus control and tracking error control based on a reproduction signal and amendment of spherical aberration by means of the objective lens 19, which are performed when an optical disk 3 is loaded in a predetermined state.

Specifically, when an optical disk 3 is loaded in a predetermined state and the loading process completes, the controller 10 starts the optimum focus position learning in which it first sets an initial focus position (SP1). More specifically, the controller 10 sets the position where the level of the focus error signal is 0 as the initial focus position.

The controller 10 then controls the spindle drive circuit 11 (FIG. 1) and laser driver 13 (FIG. 1), etc., to reproduce the trial write area on the loaded optical disk 3; and judges, based on the reproduced data, whether or not any data has been recorded in the trial write area on the optical disk 3 (SP2).

When the judgment is positive, the controller 10 proceeds to step SP4. Meanwhile, if the judgment is negative, the controller 10 controls the spindle drive circuit 11 and laser driver 13, etc., to record test data for the optimum focus position learning ("optimum focus position learning test data") in the trial write area on the optical disk 3 (SP13). Suitable optimum focus position learning test data is data where the minimum-length recording mark and a space having the same length as the minimum-length recording mark are repeatedly formed in the trial write area on the optical disk 3, but is not limited to such.

The controller 10 then controls the spindle drive circuit 11, laser driver 13 and servo drive circuit 25, etc., to reproduce the data recorded in the trial write area on the optical disk 3 (i.e., optimum focus position learning test data or any data previously recorded in the trial write area) while changing the focus position; learns the focus position where the recording mark amplitude of the reproduction signal during the period corresponding to a minimum-length recording mark and a space having the same length reaches its maximum as the optimum focus position based on the amplitude detection signal sent from the amplitude detection circuit 29; and sets the optimum focus position as the reference position for the objective lens 19 (SP4). The controller 10 then terminates the optimum focus position learning.

(1-3) Effects of Embodiment 1

As described above, in the optical disk device 1 according to Embodiment 1, the optimum focus position learning is performed based on the amplitude of a reproduction signal during the period corresponding to a minimum-length recording mark and a space having the same length.

The curve K5 in FIG. 3 is formed by plotting resolution at each focus position on the chart. As is clear in this simulation, the peak of the curve K3 representing the amplitude of the reproduction signal during the period corresponding to a minimum-length recording mark and a space having the same length comes almost at the center of the focus positions where the number of PI errors reaches its minimum. Meanwhile, the peak of the curve K5 representing the resolution is shifted from the center of the focus positions where the number of PI errors reaches its minimum. The variations in the resolution from focus position to focus position shown in the curve K5 are less than those in the recording mark amplitude from focus position to focus position shown in the curve K3, and so the peak of the curve K5 is hard to detect compared to that of the curve K3.

According to Embodiment 1, because an optimum focus position is learned/set based on the recording mark amplitude of the reproduction signal during the period corresponding to a minimum-length recording mark and a space having the same length, compared to for example the case of reference document 1 where a focus offset is set to maximize the resolution, the optimum focus position can provide a high quality reproduction signal. Accordingly, the optical disk device is capable of recording/reproducing information on optical disks with high reliability.

(2) Embodiment 2

(2-1) Principle

The optimum focus position learning in Embodiment 1 is performed where the reproduction circuit system has no AGC (Auto Gain Controller) circuit that maintains the amplitude of the RF signal constant.

Where the reproduction circuit system does not include an AGC circuit, the level of the RF signal is likely to change due to noise and so it is hard to obtain good reproduction data. Accordingly, in order to obtain a good quality reproduction signal, it is preferable that the reproduction circuit system has an AGC circuit.

Figure 7:
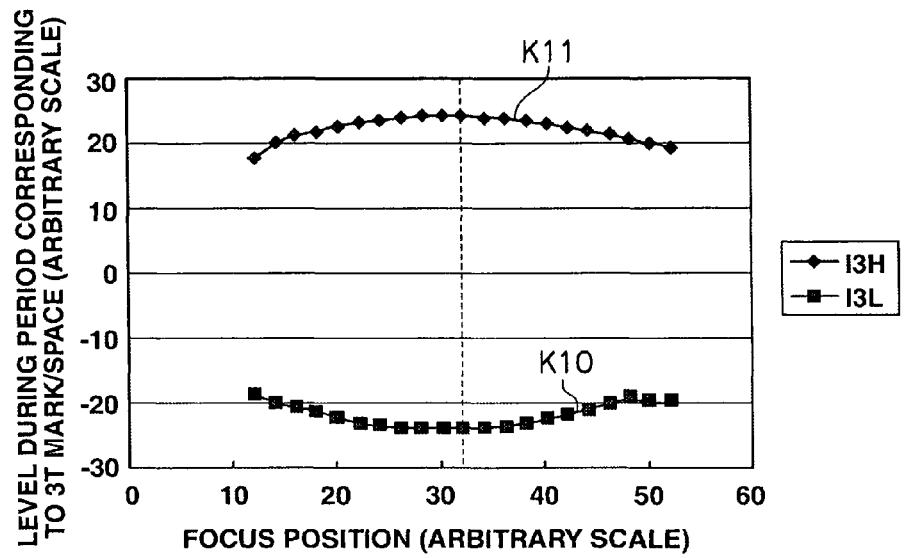
FIG. 7 is a diagram of curves illustrating the level of a reproduction signal during the period corresponding to a minimum-length recording mark and the level of the reproduction signal during the period corresponding to a space, between minimum-length recording marks, having the same length as the minimum-length recording mark, in a case where an AGC circuit is provided in the reproduction system.

However, when an AGC circuit is provided in the reproduction circuit, AGC processing performed by the AGC circuit reduces the variations due to defocus in the amplitude of the RF signal. Therefore, when reproducing the minimum-length recording marks repeatedly formed on the optical disk 3 by changing the focus position in the same manner as in FIG. 2, neither the level of the RF signal during the period corresponding to a recording mark (curve K10) nor the level of the RF signal during the period corresponding to a space (curve K11) changes dramatically from focus position to focus position, as shown in FIG. 7.

Figure 8:
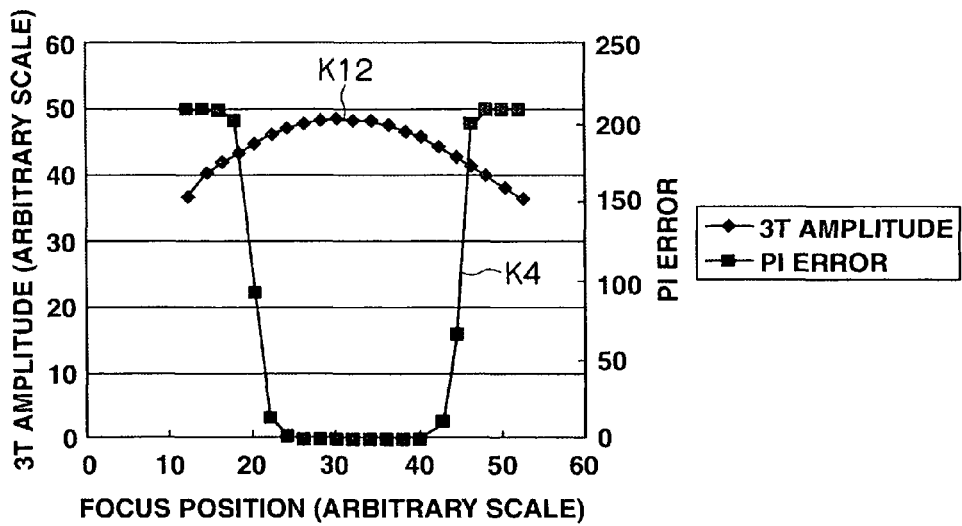
FIG. 8 is a diagram of curves illustrating the relationships between the minimum-length recording mark and PI errors when the AGC circuit is provided in the reproduction system.

Consequently, as shown in FIG. 8, the recording mark amplitude (curve K12) representing the difference between the level of the RF signal during the period corresponding to a space and the level of the RF signal during the period corresponding to a recording mark does not change so much from focus position to focus position, which makes it difficult to learn an optimum focus position based on the recording mark amplitude.

In Embodiment 2, a normalized 3T amplitude is introduced as a new index, the normalized 3T amplitude being obtained by formula (4) below:

$$\text{NORMALIZED } 3T \text{ AMPLITUDE} = R \times M \quad (4)$$

$$= \left\{ \frac{(I3H - I3L)}{(I11H - I11L)} \right\} \times \left\{ \frac{(I11H - I11L)}{(I11H)} \right\}$$

$$= \frac{(I3H - I3L)}{I11H}$$

in which index R representing the resolution obtained in formula (2) below:

$$R = (I13H - 13L)/(I11H - I11L) \quad (2)$$

and index M representing modulation obtained in formula (3) below:

$$M = (I11H - I11L)/(I11H) \quad (3)$$

are multiplied. In these formulas, the level of the RF signal during the period corresponding to a 3T-long recording mark (minimum-length recording mark) is "I3L," the level of the RF signal during the period corresponding to a 3T-long space is "I3H," the level of RF signal during the period corresponding to an 11T-long recording mark (maximum-length recording mark) is "I11L," and the level of RF signal during the period corresponding to a 11T-long space is "I11H." In formula 4, the level of the RF signal not subject to AGC processing by the AGC circuit is used as the level of the RF signal during the period corresponding to an 11T-long space.

The numerator in formula (4) remains an almost constant value regardless of the focus position because of the AGC processing by the AGC circuit; however, the denominator is susceptible to defocus of the focus position. Accordingly, an optimum focus position is set by learning the focus position where the value of normalized 3T amplitude is greatest.

Figure 9:
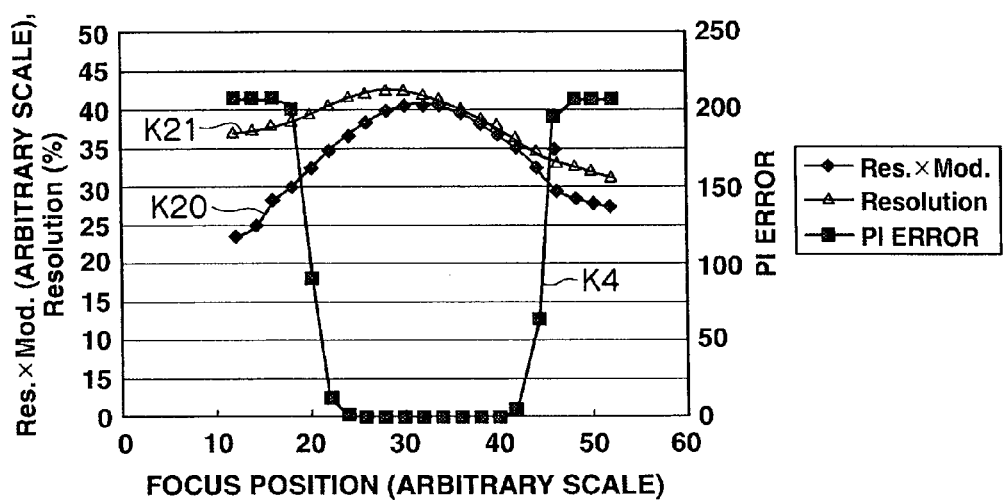
FIG. 9 is a diagram of curves illustrating the relationships between the minimum-length recording mark, resolution and PI errors according to Embodiment 2.

FIG. 9 shows the relationships between the resolution, normalized 3T amplitude and PI errors when an AGC circuit is provided in the reproduction circuit system. As is clear in FIG. 9, the peak of the curve K20 representing the normalized 3T amplitude comes almost at the center of the focus positions where the number of PI errors reaches its minimum, while the peak of the curve K21 representing the resolution is shifted from the center of the focus positions where the number of PI errors reaches its minimum. Moreover, the variations in the resolution from focus position to focus position shown in the curve K21 are less than those in the normalized 3T amplitude from focus position to focus position shown in the curve K20, and so the peak of the curve K21 is hard to detect compared to that of the curve K20.

Again in this simulation, it can be understood that a high quality reproduction signal can be obtained by learning/setting an optimum focus position based on the normalized 3T amplitude.

(2-2) Configuration of Optical Disk Device According to Embodiment 2

Figure 10:
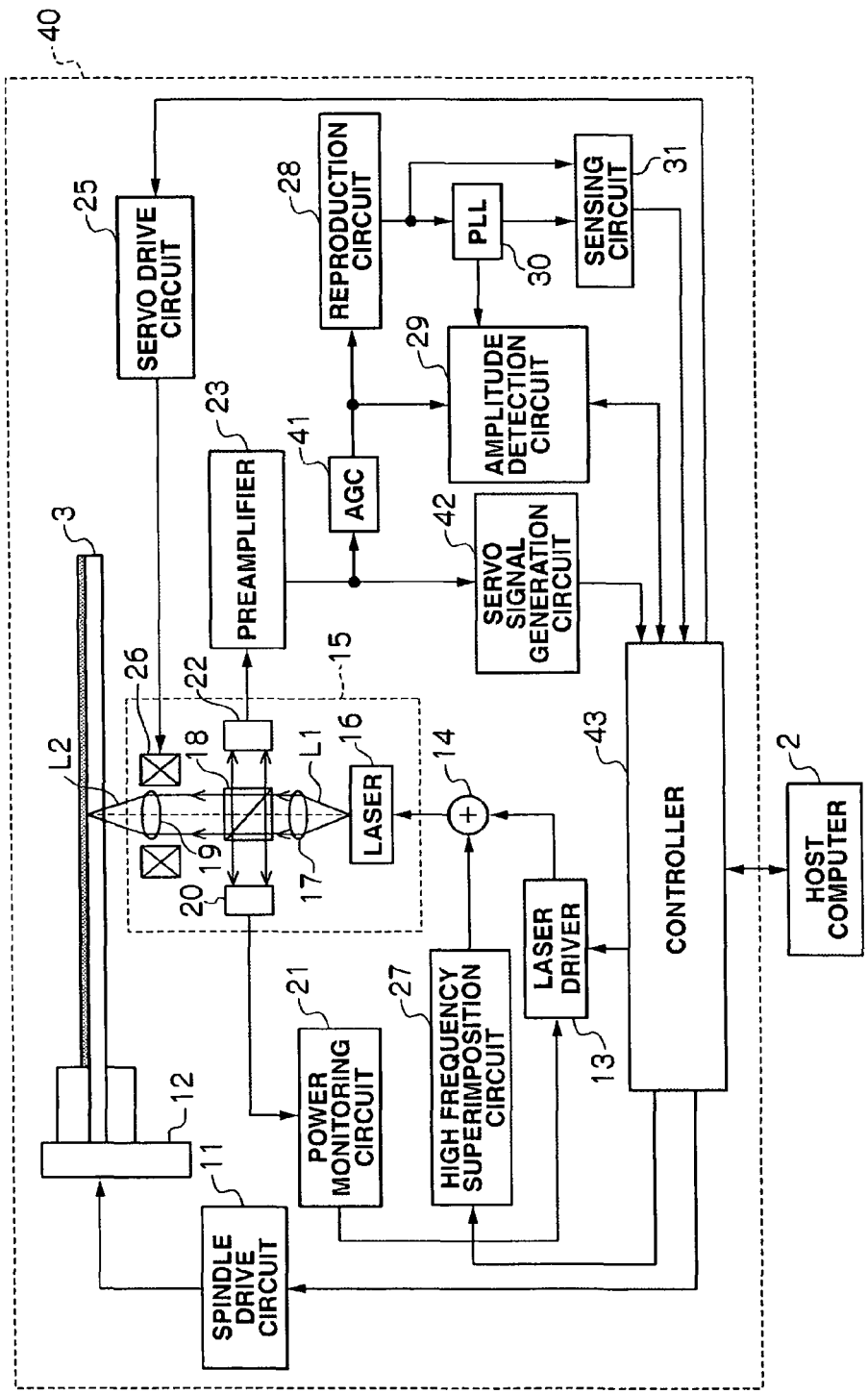
FIG. 10 is a block diagram showing the configuration of an optical disk device according to Embodiment 2.

FIG. 10 shows an optical disk device 40 according to Embodiment 2, which is configured based on the above-described principle and the same reference numerals are given to the parts corresponding to those in FIG. 1. The optical disk device 40 is configured the same as the optical disk device 1 in Embodiment 1 except that the above-described AGC circuit 41 is provided among the preamplifier 23, reproduction circuit 28 and amplitude detection circuit 29 and that the servo signal generation circuit 42 and controller 43 have different configurations from those in Embodiment 1.

In practice, in this optical disk device 40, the servo signal generation circuit 42 generates a focus error signal and tracking error signal based on an RF signal sent from the preamplifier 23; and transmits them to the controller 43 and passes the RF signal onto the controller 43.

In step SP3 in the optimum focus position learning described above in relation to FIG. 6, the controller 43 records, in a trial write area on an optical disk 3, optimum focus position learning test data for which the minimum-length recording mark, a space having the same length as the minimum-length recording mark, the maximum-length recording mark, and a space having the same length as the maximum-length recording mark are repeatedly formed, as optimum focus position learning test data.

Then, in step SP14 in the optimum focus position learning, the controller 43 detects the maximum level of the RF signal it receives from the servo signal generation circuit 42 as the level (I11H) of the reproduction signal (RF signal) during the period corresponding to a 11T-long space. The controller 43 then calculates, based on the detection result and the amplitude detection signal it receives from the amplitude detection circuit 29, a normalized 3T amplitude by formula (4); learns the focus position where the normalized 3T amplitude is maximum as an optimum focus position; and sets the optimum focus position as a reference position for the objective 19.

(2-3) Effects of Embodiment 2

As described above, in the optical disk device 40 according to Embodiment 2, a normalized 3T amplitude calculated in formula (4) is introduced as a new index and the focus position where the normalized 3T amplitude becomes maximum is learned/set as the optimum focus position so that a high quality reproduction signal is obtained. Accordingly, the optical disk device is capable of recording and reproducing information on optical disks with high reliability.

(3) Other Embodiments

In the above-described Embodiments 1 and 2, the invention is employed in the optical disk device 1 which is compatible with DVDs; however, the invention is not limited optical disk devices such as above, and can be employed in various optical disk devices compatible with other optical disks of various standards.

In Embodiments 1 and 2, an optimum focus position is learned/set based on the amplitude of a reproduction signal during the period corresponding to a 3T-long recording mark and a space having the same length. However, the invention is not limited to this case and a recording mark of length other than 3T may be used as a reference recording mark as long as an optimum focus position is learned/set based on the amplitude of the reproduction signal during the period corresponding to a minimum-length recording mark and a space having the same length related to a currently-used modulation mode (e.g., (1, 7) modulation, (2, 7) modulation etc.).

Alternatively, a recording mark other than the minimum-length recording mark, i.e., a recording mark one or two sizes larger than a minimum-length recording mark may be used as a reference recording mark. More specifically, the same effects as above can be obtained when a recording mark having a length shorter than the half of a diameter of the spot of the laser beam L1 incident on the optical disk 3 is used as a reference recording mark, the diameter being represented by $\lambda/NA$ where NA is the numerical aperture of the objective lens 19 and $\lambda$ is the wavelength of the laser beam L1.

For a DVD, $\lambda$ is about 0.66 μm, NA is 0.6, and so $\lambda/2$ NA is 0.551 μm. The 3T mark length is 0.4 μm and the 4T mark length is 0.533 μm, so either a 3T-long mark or a 4T-long mark may be used as a reference. For a BD using (1, 7) modulation, $\lambda$ is about 0.405 μm, NA is 0.85, and so $\lambda/2$ NA is 0.238 μm, and its minimum mark length is 2T. A 2T mark length is 0.149 μm and a 3T mark length is 0.2235 μm, so either a 2T-long mark or a 3T-long mark may be used as a reference. Accordingly, the same effects as the above can be obtained by using 3T or 4T-long mark for a DVD and 2T or 3T-long mark for a BD.

In Embodiment 1, the detection unit—that detects the position (focus position) of the objective lens 19 where the amplitude of the RF signal during the period corresponding to a minimum-length recording mark and a space having the same length reaches its maximum—is configured from the servo drive circuit 25, preamplifier 23, reproduction circuit 28, amplitude detection circuit 29, PLL circuit 30, sensing circuit 31, and controller 10, etc., and a setting unit—that sets the position of the objective lens 19 detected by the above detection unit where the amplitude of the RF signal during the period corresponding to a minimum-length recording mark and a space having the same length reaches its maximum, as a reference position for use in focus control for the objective lens 19 relative to the optical disk 3—is configured from the controller 10. However, the invention is not limited to this case and a wide variety of other configurations may be employed as configurations for the detection unit and setting unit.

Likewise, in Embodiment 2, the detection unit—that detects the position (focus position) of the objective lens 19 where the result of multiplication of the resolution and the modulation becomes greatest—is configured from servo drive circuit 25, preamplifier 23, reproduction circuit 28, amplitude detection circuit 29, PLL circuit 30, sensing circuit 31, and controller 43, etc., and the setting unit—that sets the position of the objective lens 19 detected by the above detection unit where the result of multiplication of the resolution and the modulation becomes greatest, as a reference position for use in focus control for the objective lens 19 relative to the optical disk 3—is configured from the controller 43. However, the invention is not limited to this case and a wide variety of other configurations may be employed as configurations for the detection unit and setting unit.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. An optical disk device for focusing a laser beam onto an optical disk using an objective lens and reproducing data recorded on the optical disk as a string of recording marks of different lengths, based on the laser beam reflected from the optical disk, comprising:
 a detection unit for detecting a position of the objective lens where the amplitude of the reproduction signal during the period corresponding to a minimum-length recording mark and a space having the same length reaches its maximum; and a setting unit for setting the detected position as a reference position for the objective lens relative to the optical disk, for use in focus control;

wherein the detection unit reproduces test data recorded on the optical disk while sequentially hanging the position of the objective lens relative to the optical disk, detects, at each position, the amplitude of the reproduction signal during the period corresponding to a minimum-length recording mark and a space having the same length; and detects, based on the detection result, the position of the objective lens where the amplitude of the reproduction signal during the period corresponding to a minimum-length recording mark and a space having the same length reaches its maximum.

2. The optical disk device according to claim 1, wherein the test data is data for which a minimum-length recording mark and a space, between minimum-length recording marks, having the same length as the minimum-length recording mark are repeatedly formed on the optical disk.

3. The optical disk device according to claim 1, wherein the detection unit:

generates a reproduction clock based on the reproduction signal;

samples the reproduction signal at rising edges of the generated reproduction clock;

detects the edges of the minimum-length recording mark based on the value of the sampled reproduction signal and the level of a direct current component of the reproduction signal; and detects the amplitude of a reproduction signal during the period corresponding to a minimum-length recording mark and a space having the same length, based on the above detection result.

4. An optical device control method, the optical disk device being for focusing a laser beam onto an optical disk using an objective lens and reproducing data recorded on the optical disk as a string of recording marks of different lengths, based on the laser beam reflected form the optical disk, comprising:

a first step of detecting a position of the objective lens where the amplitude of the reproduction signal during the period corresponding to a minimum-length recording mark and a space having the same length reaches its maximum; and a second step of setting the detected position as a reference position for the objective lens relative to the optical disk, for use in focus control;

wherein the first step includes reproducing test data recorded on the optical disk while sequentially changing the position of the objective lens relative to the optical disk; detecting, at each position, the amplitude of a reproduction signal during the period corresponding to a minimum-length recording mark and a space having the same length; and detecting, based on the detection result, the position of the objective lens where the amplitude of a reproduction signal during the period corresponding to a minimum-length recording mark and a space having the same length reaches its maximum.

5. The optical disk device control method according to claim 4, wherein the test data is data for which a minimum-length recording mark and a space between minimum-length recording marks, having the same length as the minimum-length recording mark are repeatedly formed on the optical disk.

6. The optical disk device control method according to claim 4, wherein the first step includes:

generating a reproduction clock based on the reproduction signal;

sampling the reproduction signal at rising edges of the generated reproduction clock;

detecting the edges of the minimum-length recording mark based on the value of the sampled reproduction signal and the level of the direct current component of the reproduction signal; and detecting the amplitude of a reproduction signal during the period corresponding to a minimum-length recording mark and a space having the same length based on the above detection result.

7. An optical disk device for focusing a laser beam onto an optical disk using an objective lens and reproducing data recorded on the optical disk as a string of recording marks of different lengths, based on the laser beam reflected form the optical disk, comprising:

a detection unit for detecting a position of the objective lens where the result of multiplication of resolution and modulation becomes greatest; and a setting unit for setting the detected position as a reference position for the objective lens relative to the optical disk, for use in focus control;

wherein the detection unit reproduces test data recorded on the optical disk while sequentially changing the position of the objective lens relative to the optical disk; detects, at each position, the result of multiplication of resolution and modulation based on the reproduced test data; and detects, based on the detection result, the position of the objective lens where the result of multiplication of the resolution and the modulation becomes greatest.

8. The optical disk device according to claim 7, wherein the detection unit detects the result of multiplication of the resolution and the modulation as a value obtained by dividing a difference between the level of a reproduction signal during the period corresponding to a minimum-length space and the level of the reproduction signal during the period corresponding to a minimum-length mark, by the level of the reproduction signal during the period corresponding to a maximum length space.

9. The optical disk device according to claim 8, wherein the test data is data for which a minimum-length recording mark and a space, between recording marks, having the same length as the minimum-length recording mark and a space, between recording marks, having the same length as the maximum-length recording mark, are repeatedly formed on the optical disk.

10. The optical disk device according to claim 8, wherein the detection unit:

generates a reproduction clock based on the reproduction signal;

samples the reproduction signal at rising edges of the generated reproduction clock;

detects the edges of the minimum-length recording mark based on the value of the sampled reproduction signal and the level of a direct current component of the reproduction signal; and detects the amplitude of a reproduction signal during the period corresponding to a minimum-length recording mark and a space having the same length based on the above detection result.

11. An optical disk device control method, the optical disk device being for focusing a laser beam onto an optical disk using an objective lens and reproducing data recorded on the optical disk as a string of recording marks of different lengths, based on the laser beam reflected from the optical disk, comprising:

a first step of detecting a position of the objective lens where the result of multiplication of resolution and modulation becomes maximum; and a second step of setting the detected position as a referenced position for the objective lens relative to the optical disk, for use in focus control;

wherein the first step includes: reproducing test data recorded on the optical disk while sequentially changing the position of the objective lens relative to the optical disk; detects, at each position, the result of multiplication of resolution and modulation based on the reproduced test data; and detects, based on the detection result, the position of the objective lens where the result of multiplication of the resolution and the modulation becomes greatest.

12. The optical disk device control method according to claim 11, wherein the first step includes detecting the result of multiplication of the resolution and the modulation as a value obtained by dividing a difference between the level of a reproduction signal during the period corresponding to a minimum-length space and the level of the reproduction signal during the period corresponding to a minimum-length mark, by the level of the reproduction signal during the period corresponding to a maximum length space.

13. The optical disk device control method according to claim 12, wherein the test data is data for which a minimum-length recording mark and a space, between recording marks, having the same length as a maximum-length recording mark are repeatedly formed on the optical disk.

14. The optical disk device control method according to claim 12, wherein the first step includes:

generating a reproduction clock based on the reproduction signal;

sampling the reproduction signal at rising edges of the generated reproduction clock;

detecting the edges of the minimum-length recording mark based on the value of the sampled reproduction signal and the level of a direct current component of the reproduction signal; and detecting the amplitude of a reproduction signal during the period corresponding to a minimum-length recording mark and a space having the same length, based on the above detection result.

* * * * *

UNITED STATES PATENT AND TRADEMARK OFFICE
CERTIFICATE OF CORRECTION

| | |
|---|---|
| PATENT NO. | : 7,995,430 B2 |
| APPLICATION NO. | : 12/080138 |
| DATED | : August 9, 2011 |
| INVENTOR(S) | : Toda et al. |

It is certified that error appears in the above-identified patent and that said Letters Patent is hereby corrected as shown below:

Cover Page:

In the bibliographic data at (73) Assignee,

"Hitachi-LG Data Storage, Inc., Tokyo (JP)"

should read,

-- Hitachi, Ltd., Tokyo (JP);
Hitachi-LG Data Storage, Inc., Tokyo, (JP) --

Signed and Sealed this
Sixth Day of November, 2012

David J. Kappos
*Director of the United States Patent and Trademark Office*